United States Patent
Liu et al.

(10) Patent No.: US 10,317,782 B2
(45) Date of Patent: Jun. 11, 2019

(54) LASER LIGHT SOURCE AND LASER PROJECTION DISPLAY DEVICE

(71) Applicants: HISENSE CO., LTD., Qingdao (CN); Hisense USA Corp., Suwanee, GA (US); HISENSE INTERNATIONAL CO., LTD., Qingdao (CN)

(72) Inventors: Xianrong Liu, South area of Qingdao (CN); Youliang Tian, South area of Qingdao (CN)

(73) Assignees: HISENSE CO., LTD., Qingdao (CN); HISENSE USA CORP., Suwanee, GA (US); HISENSE INTERNATIONAL CO., LTD., Shandong (CN)

( * ) Notice: Subject to any disclaimer, the term of this patent is extended or adjusted under 35 U.S.C. 154(b) by 292 days.

(21) Appl. No.: 15/172,967

(22) Filed: Jun. 3, 2016

(65) Prior Publication Data
US 2017/0038667 A1    Feb. 9, 2017

(30) Foreign Application Priority Data

Aug. 4, 2015    (CN) .......................... 2015 1 0471258

(51) Int. Cl.
*G03B 21/14*    (2006.01)
*G03B 21/20*    (2006.01)
(Continued)

(52) U.S. Cl.
CPC ....... *G03B 21/2033* (2013.01); *G03B 21/145* (2013.01); *G03B 21/20* (2013.01);
(Continued)

(58) Field of Classification Search
CPC .. G03B 21/2033; G03B 21/20; G03B 21/145; G03B 21/16; F21V 31/005; F21V 31/00;
(Continued)

(56) References Cited

U.S. PATENT DOCUMENTS 4,460,102 A * 7/1984 Barringer ............... B65D 81/18
                                                        220/521
6,297,448 B1 * 10/2001 Hara .................... H05K 5/0047
                                                         174/50.5
(Continued)

FOREIGN PATENT DOCUMENTS

CN    101329058 A    12/2008
CN    202532419 U    11/2012
(Continued)

OTHER PUBLICATIONS

First Chinese Office Action issued in corresponding Chinese Patent Application No. 201510471258.4, dated Aug. 23, 2018, with English translation.
(Continued)

*Primary Examiner* — Bryon T Gyllstrom
*Assistant Examiner* — James M Endo
(74) *Attorney, Agent, or Firm* — McDermott Will & Emery LLP

(57) ABSTRACT

A laser projection display device, relating to the technical field of laser, including a laser light source having a light source shell, an airtight device fixed on an inner wall of the light source shell, and a laser device provided in the interior of the airtight device. The airtight device having a sealing housing and a gas pressure adjustment structure, the sealing housing is fixed on an inner wall of the light source shell, the gas pressure adjustment structure is arranged on one side of the sealing housing, the sealing housing is communicated with the gas pressure adjustment structure, and the gas pressure adjustment structure is configured to adjust the volume of the airtight device.

20 Claims, 6 Drawing Sheets

(51) Int. Cl.
*F21V 31/00* (2006.01)
*F21V 29/65* (2015.01)
*G03B 21/16* (2006.01)
*F21V 25/12* (2006.01)
*F21V 15/01* (2006.01)

(52) U.S. Cl.
CPC ............... *F21V 15/01* (2013.01); *F21V 25/12* (2013.01); *F21V 29/65* (2015.01); *F21V 31/00* (2013.01); *F21V 31/005* (2013.01); *G03B 21/16* (2013.01)

(58) Field of Classification Search
CPC .......... F21V 31/04; F21V 15/01; F21V 29/02; F21V 29/60; F21V 29/65; F21V 25/12; F21V 29/83; F21S 45/43; F21S 45/435
USPC ........... 362/259, 294, 547; 353/119; 352/41, 352/198, 203
See application file for complete search history.

(56) References Cited

U.S. PATENT DOCUMENTS

| | | | | |
|---|---|---|---|---|
| 7,838,768 B2* | 11/2010 | Zadach | ................ | H05K 5/0213 174/17 VA |
| 2004/0025691 A1* | 2/2004 | Vanderhoof | ........... | B01D 53/02 95/90 |
| 2008/0137350 A1* | 6/2008 | Tian | ........................ | B63B 45/00 362/362 |
| 2010/0026973 A1* | 2/2010 | Hemphill | .............. | G06F 1/1601 353/119 |
| 2010/0321646 A1* | 12/2010 | Nakano | ................... | G03B 21/14 353/119 |
| 2011/0019160 A1* | 1/2011 | Kitano | .................... | G03B 21/16 353/57 |
| 2011/0211166 A1* | 9/2011 | Kawano | ................. | G03B 21/16 353/20 |
| 2012/0249981 A1 | 10/2012 | Hirosawa | | |
| 2012/0300179 A1* | 11/2012 | Masuda | .................. | F21V 15/01 353/52 |
| 2013/0063705 A1* | 3/2013 | Takamatsu | ......... | G03B 21/2033 353/31 |
| 2014/0293430 A1* | 10/2014 | Takahashi | ............ | G03B 21/005 359/630 |
| 2017/0038667 A1 | 2/2017 | Liu et al. | | |

FOREIGN PATENT DOCUMENTS

| | | |
|---|---|---|
| CN | 103062739 A | 4/2013 |
| CN | 103471065 A | 12/2013 |
| CN | 103885274 A | 6/2014 |
| CN | 104696929 A | 6/2015 |
| CN | 106444241 A | 2/2017 |

OTHER PUBLICATIONS

Second Chinese Office Action issued in corresponding Chinese Patent Application No. 201510471258.4, dated Aug. 23, 2018, with English translation.

* cited by examiner

LASER LIGHT SOURCE AND LASER PROJECTION DISPLAY DEVICE

FIELD OF TECHNOLOGY

The present disclosure relates to the technical field of laser, and in particular to a laser light source and a laser projection display device.

BACKGROUND

Laser light sources, as excellent coherent light sources, have been widely used in industrial applications, medical applications, scientific research, information, military applications and other fields due to their good monochromaticity, high directionality, high luminous flux and the like. However, laser light sources are highly sensitive to the environment, and dust, humidity, temperature, gas pressure and other environmental conditions will significantly influence the performance and service life of laser light sources.

SUMMARY OF THE DISCLOSURE

In a first aspect, the present disclosure provides a laser light source, including a light source shell, an airtight device fixed on an inner wall of the light source shell, and a laser device provided in the interior of the airtight device; and the airtight device includes a sealing housing and a gas pressure adjustment structure, the sealing housing is fixed on an inner wall of the light source shell, the gas pressure adjustment structure is arranged to one side of the sealing housing, the sealing housing is communicated with the gas pressure adjustment structure, and the gas pressure adjustment structure is configured to adjust the volume of the airtight device.

In a second aspect, the present disclosure provides a laser projection display device, including the laser light source as described in the first aspect.

BRIEF DESCRIPTION OF THE DRAWINGS

To describe embodiments of the present disclosure or technical solutions of the prior art more clearly, drawings to be used in the description of the embodiments or prior art will be simply introduced below. Apparently, the drawings in the following description are merely some of embodiments of the present disclosure, and according to those drawings, other drawings may occur to those skilled in the art without any creative effort.

FIG. 10 is a schematic structure diagram of another sealing housing and another gas pressure adjustment structure according to the embodiments of the present disclosure, in which:

11: laser array;
111: laser;
12: beam shaping module;
121: reflector;
122: convex lens;
123: concave lens;
13: fluorescence conversion module;
131: dichroic mirror;
132: fluorescence wheel;
14: color filter and output module;
134: filter wheel;
20: airtight device;
110: sealing housing on an outer side of the laser array;
120: sealing housing on an outer side of the beam shaping module;
130: sealing housing on an outer side of the fluorescence conversion module and the color filter and output module;
21: sealing housing;
22: gas pressure adjustment structure;
220: gas chamber;
221: first end of the gas chamber;
222: second end of the gas chamber;
30: piston;
31: first cavity formed by the piston and the gas chamber;
32: second cavity formed by the piston and the gas chamber;
60: elastic film;
61: first cavity formed by the elastic film and the gas chamber;
62: second cavity formed by the elastic film and the gas chamber;
90: through-hole;
91: first through-hole;
92: second through-hole; and
93: conduit.

DETAILED DESCRIPTION OF THE PREFERRED EMBODIMENTS

The technical solutions of the embodiments of the present disclosure will be clearly and completely described below with reference to the drawings of the embodiments of the present disclosure. Apparently, the described embodiments are merely some but not all of embodiments of the present disclosure. All other embodiments which occur to, on the basis of the embodiments of the present disclosure, those skilled in the art without any creative effort shall be included in the protection scope of the present disclosure.

It is to be noted that, terms such as "first" and "second" in the present application are provided merely for distinguishing identical or similar items having substantially same functions and effects, not for defining the number and the execution order.

Embodiment 1

This embodiment provides a laser light source, including a light source shell, an airtight device fixed on an inner wall of the light source shell, and a laser device provided in the interior of the airtight device.

Figure 1:
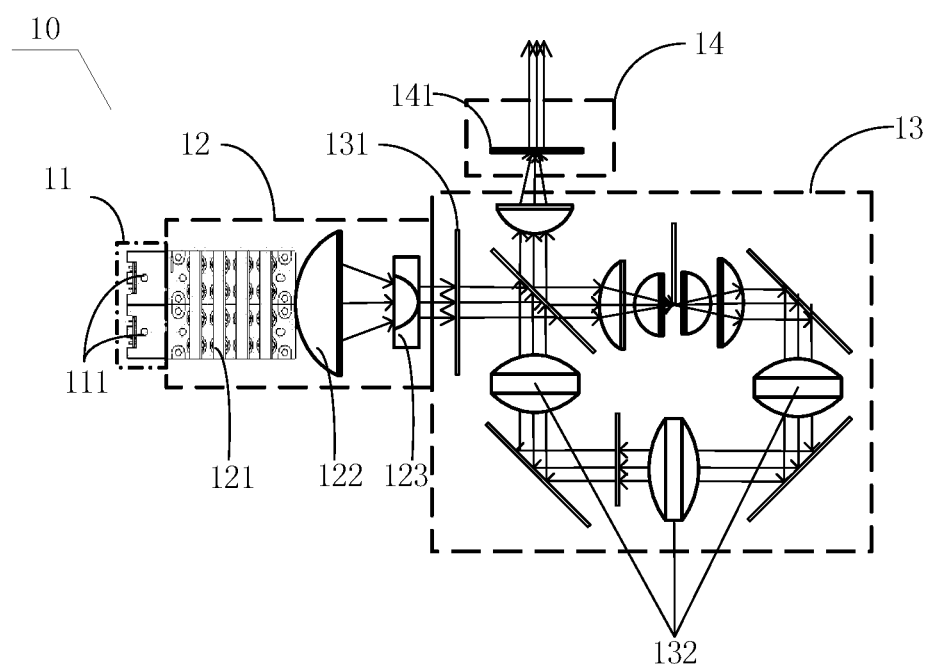
FIG. 1 is a schematic structure diagram of a laser array, a beam shaping module, a fluorescence conversion module, and a color filter and output module, according to embodiments of the present disclosure.

Specifically, referring to FIG. 1, the laser device 10 includes a laser array 11, a beam shaping module 12, a fluorescence conversion module 13, and a color filter and output module 14. The laser array 11 includes a plurality of lasers 111. In FIG. 1, description is given by taking a case in which two lasers are included as an example, and the laser usually consists of a laser diode array. The beam shaping module 12 consists of a plurality of optical lenses. As an example, the beam shaping module 12 may include optical lenses such as a reflector 121, a convex lens 122, a concave lens 123. The fluorescence conversion module 13 includes a dichroic mirror 131, a fluorescence wheel 132, and a blue-ray relay loop. The color filter and output module 14 is usually formed by a filter wheel 141. The following shows the propagation of rays in the interior of the laser light source: first, rays are generated by the laser array 11 and incident into the beam shaping module 12; after being integrated by the beam shaping module 12, the rays then enter the fluorescence conversion module 13; in the fluorescence conversion module 13, the fluorescence wheel 132 is excited to emit light; and finally, rays from the fluorescence wheel 132 are color filtered by the filter wheel 141 of the color filter and output module 14 to become emergent rays from the laser light source. In FIG. 1, lines with an arrow indicate rays in the interior of the laser light source when in use, and the arrow indicates the direction of rays.

It is to be noted that, in FIG. 1, description is given by taking a case in which the laser device 10 includes the laser array 11, the beam shaping module 12, the fluorescence conversion module 13, and the color filter and output module 14 as an example. However, the structure of the laser device 10 as shown in FIG. 1 can not be regarded as the defining to the embodiments of the present disclosure. Those skilled in the art may set the structure of the laser device according to actual requirements. For example, the laser device 10 may also include the laser array 11 and the fluorescence conversion module 13 only.

Figure 2:
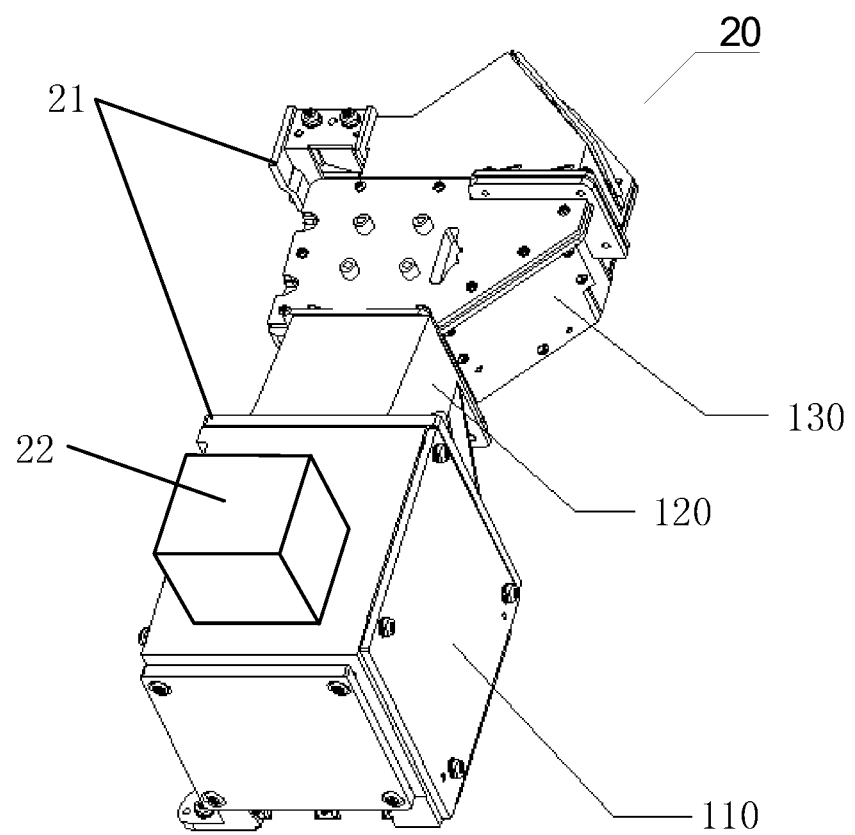
FIG. 2 is a schematic structure diagram of an airtight device according to the embodiments of the present disclosure.

Further, referring to FIG. 2, the airtight device 20 includes a sealing housing 21 and a gas pressure adjustment structure 22, the sealing housing 21 is communicated with the gas pressure adjustment structure 22, and the gas pressure adjustment structure 22 is configured to adjust the volume of the airtight device 20.

Sealing the laser devices of the laser light source as a whole by a airtight device may isolate the interior of the laser light source from the outside and can prevent dust from entering the interior of the laser light source. However, since the laser light source will generate heat during its operation, if completely airtight, the rise of the temperature will result in the increment of the gas pressure of the interior of the airtight device and result in great pressure on the airtight device, thereby degrading the reliability of the airtight device. For example, if the gas pressure in the interior of the airtight device is too high, leakage of the airtight device will occur, and further, during a repeated process in which the temperature rises when the laser light source is turned on and correspondingly the gas pressure rises and then the temperature falls when the laser light source is turned off and correspondingly the gas pressure falls, gas exchange will occur repeatedly between the interior and the exterior of the sealing housing. As a result, dust from the external gas will enter the interior of the airtight device during the process of gas stream exchange, resulting in contamination of the interior of the airtight device. By such a design that the airtight device of this embodiment consists of a sealing housing and a gas pressure adjustment structure, and the gas pressure adjustment structure can adjust the volume of the airtight device, when the gas pressure in the interior of the airtight device changes, the gas pressure in the interior of the airtight device of the laser light source may be maintained stable by adjusting the volume of the airtight device. Consequently, the gas exchange between the interior and the exterior of the sealing housing is reduced and the dust prevention purpose is achieved.

Specifically, with regard to the laser device 10 as shown in FIG. 1, the sealing housing 21 outside the laser device 10 may consist of three parts, i.e., a sealing housing 110 on an outer side of the laser array 11, a sealing housing 120 on an outer side of the beam shaping module 12, and a sealing housing 130 on an outer side of the fluorescence conversion module 13 and the color filter and output module 14. The sealing housing 21 may be integrally molded, or, the various parts of the sealing housing 21 may be respectively manufactured first and then connected together by welding, gluing and by using a sealing gasket (for example, a rubber ring). When the optical lenses are at the edge of the laser devices, the optical lenses may be connected to the sealing housing by dispensing to completely seal the interior of the sealing housing. Preferably, the size of the sealing housing 110 on the outer side of the laser array 11 is matched with that of the laser array 11; the size of the sealing housing 120 on the outer side of the beam shaping module 12 is matched with that of the beam shaping module 12; and the size of the sealing housing 130 on the outer side of the fluorescence conversion module 13 and the color filter and output module 14 is matched with that of the fluorescence conversion module 13 and the color filter and output module 14. Matching the size of the sealing housing with that of the laser devices therein may reduce the volume of the laser light source.

Fixing the sealing housing on the inner wall of the light source shell may be implemented in the following two ways.

First implementation way: The airtight housing itself is a closed housing, and any number of faces of the sealing housing are fixed on the inner wall of the light source shell by welding, gluing, screwing or the like.

Second implementation way: The sealing housing itself is partially closed, and, a closed housing is formed, in the aid of the inner wall of the light source shell, only after fixing at least one face of the sealing housing on the inner wall of the light source shell by welding, gluing, screwing or the like. For example, a lower surface of the sealing housing is fixed on the inner wall of the light source shell to form a closed housing. For another example, a lower surface and a right surface of the sealing housing are fixed on the inner wall of the light source shell to form a closed housing. By the second implementation way, the space of the interior of the light source shell, occupied by the sealing housing, may be reduced, which facilitates the reduction of volume and weight of the laser light source.

The laser light source of the embodiment of the present disclosure includes a light source shell, an airtight device fixed on the inner wall of the light source shell, and a laser device provided in the interior of the airtight device. That is, by the airtight device, laser devices such as the laser array and the fluorescence conversion module are sealed in the interior of the airtight device as a whole. Furthermore, the airtight device consists of a sealing housing and a gas pressure adjustment structure, and the gas pressure adjustment structure can adjust the volume of the airtight device. Hence, in the embodiment of the present disclosure, when the gas pressure in the interior of the airtight device changes, the gas pressure in the interior of the airtight device of the laser light source may be maintained stable by adjusting the volume of the airtight device. Consequently, the gas exchange between the interior and the exterior of the sealing housing is reduced, and dust in the external gas is prevented from entering the interior of the airtight device during the process of gas stream exchange so that the dust prevention purpose is achieved.

Embodiment 2

Figure 3:
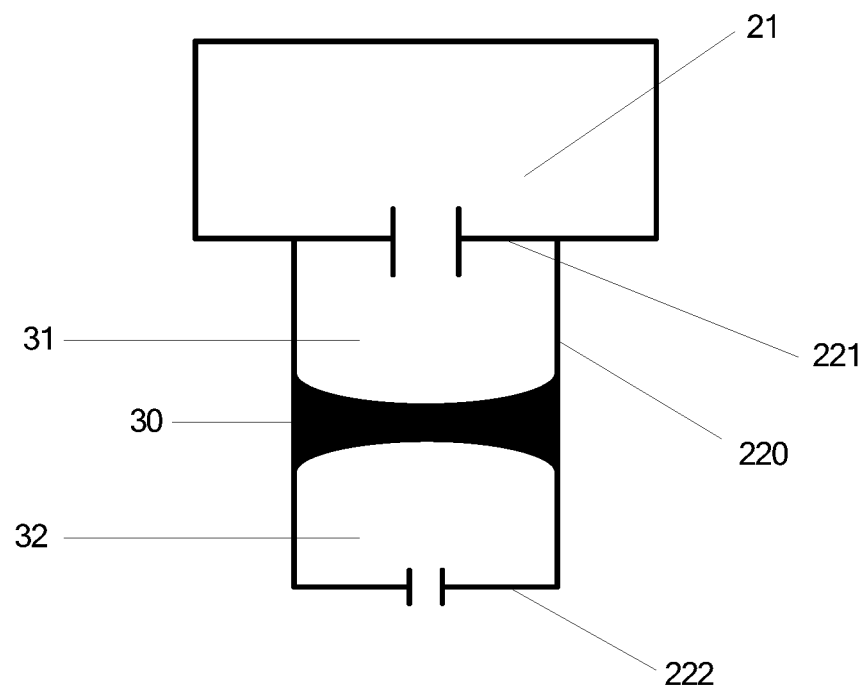
FIG. 3 is a schematic structure diagram of a gas pressure adjustment structure according to the embodiments of the present disclosure.

As an example, referring to FIG. 3, the gas pressure adjustment structure 22 includes a gas chamber 220 and a piston 30; and the piston 30 is arranged between the first end 221 and the second end 222 of the gas chamber 220 along the inner wall of the gas chamber 220, the piston 30 forms a first cavity 31 with the first end 221 of the gas chamber and forms a second cavity 32 with the second end 222 of the gas chamber, the first cavity 31 is communicated with the sealing housing 21 and the second cavity 32 is communicated with the atmosphere, and the piston 30 can slide between the first end 221 and the second end 222 of the gas chamber.

Figure 4:
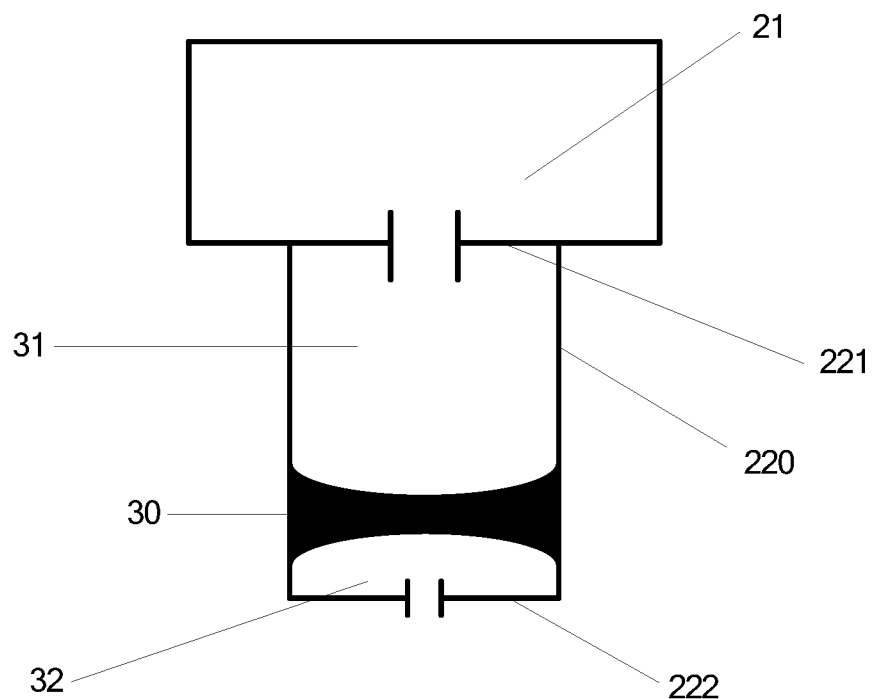
FIG. 4 is a schematic structure diagram when a piston moves towards a second end of a gas chamber, according to the embodiments of the present disclosure.
Figure 5:
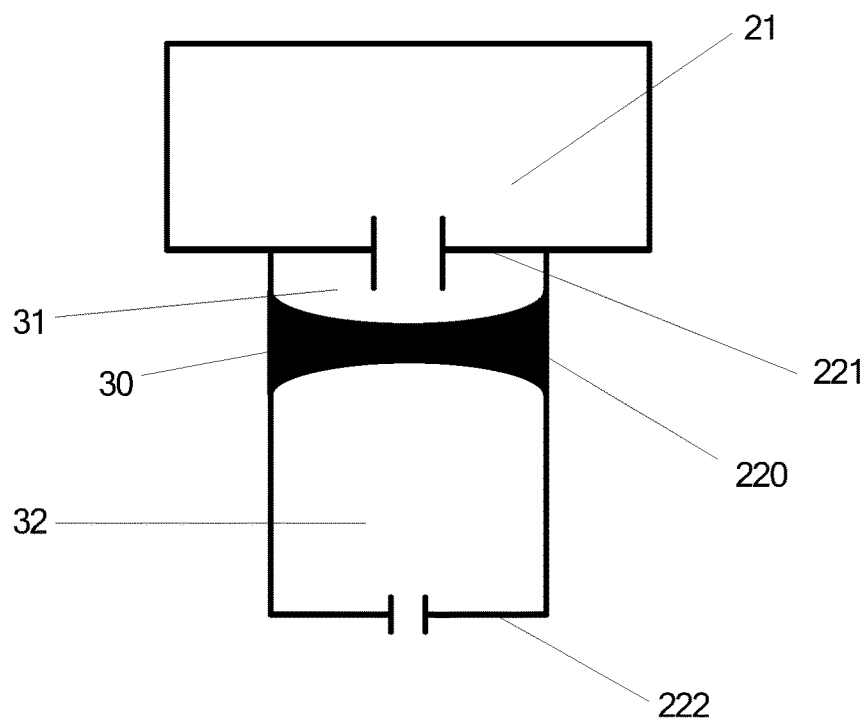
FIG. 5 is a schematic structure diagram when the piston moves towards a first end of the gas chamber, according to the embodiments of the present disclosure.

Further, referring to FIG. 4 and FIG. 5, FIG. 4 is a schematic structure diagram of a gas pressure adjustment device when the gas pressure in the interior of the sealing housing increases; and FIG. 5 is a schematic structure diagram of the gas pressure adjustment device when the gas pressure in the interior of the sealing housing decreases. When the gas pressure in the interior of the sealing housing increases, the piston 30 slides towards the second end 222 of the gas chamber 220, the first cavity 31 becomes larger and the volume of the airtight device thus increases, and consequently the gas pressure in the interior of the airtight device may be decreased. When the gas pressure in the interior of the sealing housing decreases, the piston 30 slides towards the first end 221 of the gas chamber 220, the first cavity 31 becomes smaller and the volume of the airtight device decreases, and consequently the gas pressure in the interior of the airtight device may be increased. Further, since the second cavity 32 is communicated with the atmosphere, the gas pressure in the first cavity may be maintained equal to that in the second cavity. That is, the gas pressure in the interior of the sealing housing may be maintained the same as the atmospheric pressure.

It is to be noted that, the adjustment range of this gas pressure adjustment structure depends upon the size of the gas chamber 220. Therefore, the size of the gas chamber should be calculated and set according to change in temperature in the environment of the laser light source and change in temperature in the interior of the airtight device when the laser light source operates. For example, the temperature in the environment of the laser light source is −5° C. (approximately equal to 268K) to 30° C. (approximately equal to 303 K), and when in operation, the temperature in the interior of the airtight device is 60° C. (approximately equal to 333 K) to 70° C. (approximately equal to 343 K). In this case, the change in temperature in the interior of the airtight device is 268 K to 343 K.

According to the desired state equation of gas $PV/T=C$, where C is a constant, P is the pressure (unit: Pa), V is the volume (unit: $cm^3$), T is the temperature (unit: K), when the temperature changes, in the premise of not changing the internal volume of the airtight device, $P1V/343=P2V/268$, $P1=(343/268)P2$, where P1 is the pressure in the interior of the sealing housing when the temperature is 343 K, P2 is the pressure in the interior of the sealing housing when the temperature is 268 K. As can be seen, P1 is approximately 1.3 times of P2. That is, P1 is increased by 0.3 times when compared with P2. If it is intended to maintain the pressure in the interior of the sealing housing constant, it is necessary to increase the volume of the airtight device by 0.3 times. That is, the internal volume of the gas chamber 220 should be greater than or equal to 0.3 times of the internal volume of the sealing housing.

Embodiment 3

Figure 6:
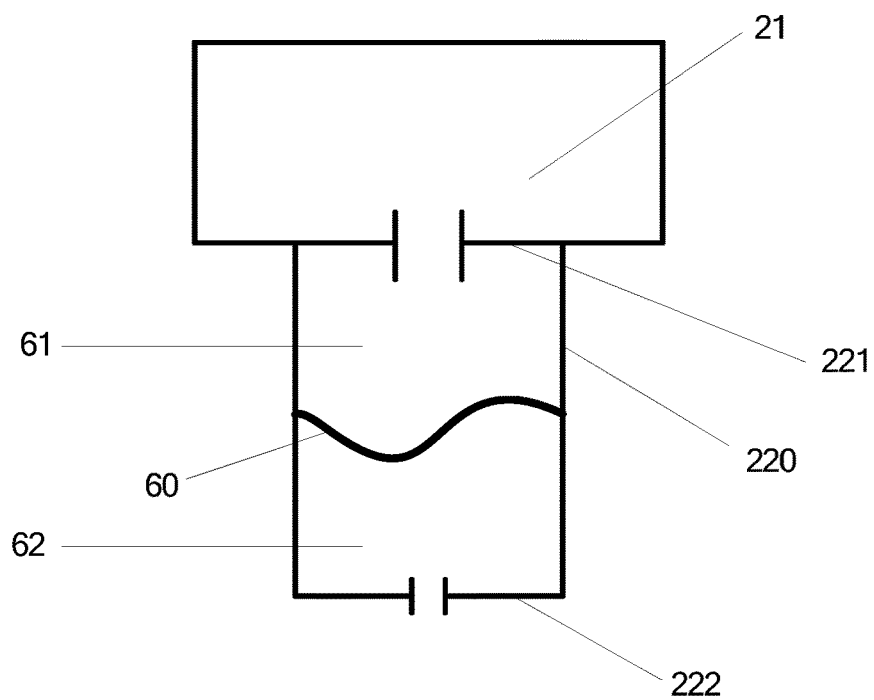
FIG. 6 is a schematic structure diagram of another gas pressure adjustment structure according to the embodiments of the present disclosure.

As an example, referring to FIG. 6, the gas pressure adjustment structure 22 includes a gas chamber 220 and an elastic film 60; and an outer edge of the elastic film 60 is sealed on the inner wall between the first end 221 and the second end 222 of the gas chamber 220, the elastic film 60 forms a first cavity 61 with the first end 221 of the gas chamber 220 and forms a second cavity 62 with the second end 222 of the gas chamber 220, the first cavity 61 is communicated with the sealing housing 21 and the second cavity 62 is communicated with the atmosphere, and the elastic film 60 can expand and shrink between the first end and the second end of the gas chamber.

Figure 7:
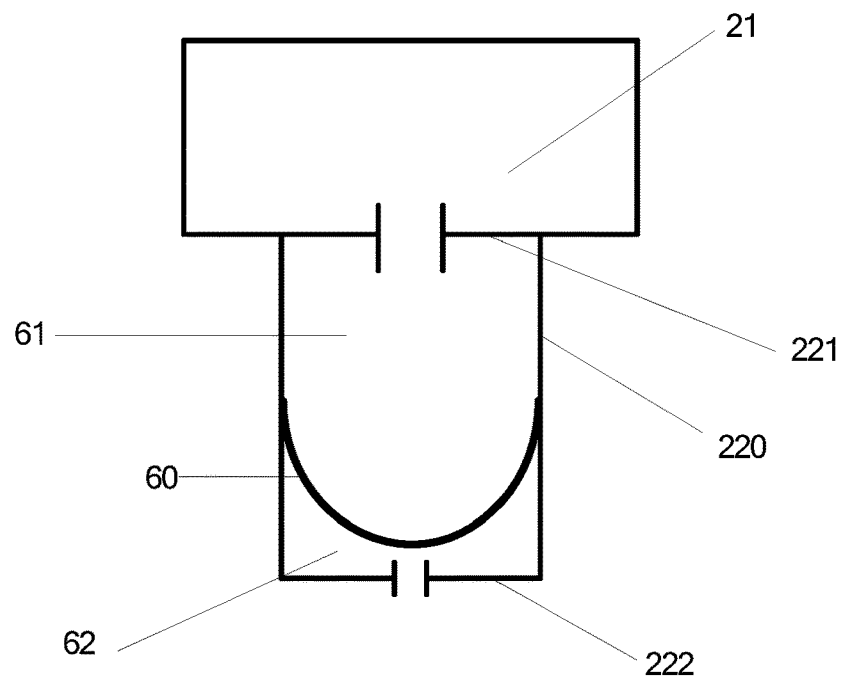
FIG. 7 is a schematic structure diagram when an elastic film expands towards the second end of the gas chamber, according to the embodiments of the present disclosure.
Figure 8:
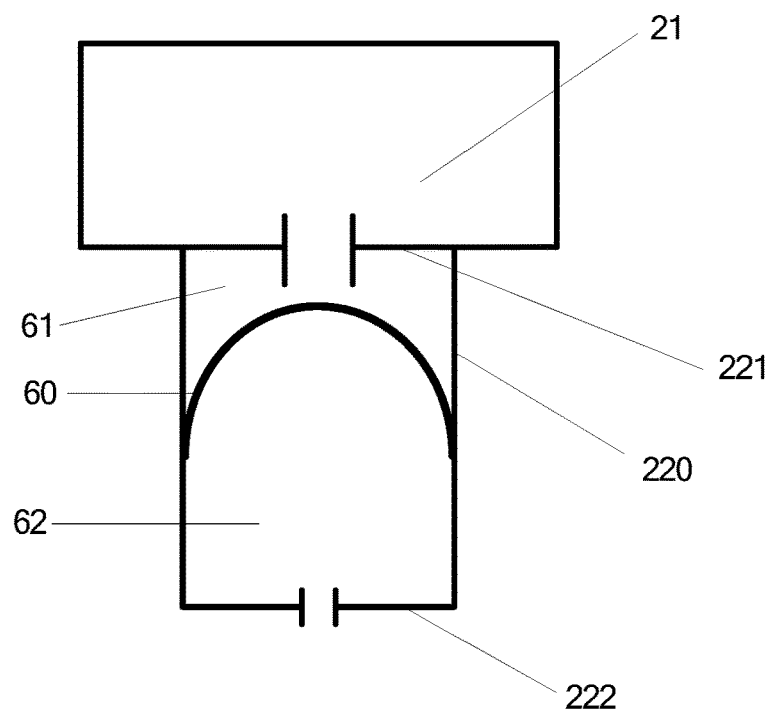
FIG. 8 is a schematic structure diagram when the elastic film expands towards the first end of the gas chamber, according to the embodiments of the present disclosure.

In FIG. 6, description is given by taking a case in which the elastic film is in a shrunk state as an example. Further, referring to FIG. 7 and FIG. 8, FIG. 7 is a schematic structure diagram when the elastic film expands towards the second end 222 of the gas chamber 220; and FIG. 8 is a schematic structure diagram when the elastic film expands towards the first end 221 of the gas chamber 220. When the gas pressure in the interior of the sealing housing increases, the elastic film 60 expands towards the second end 222 of the gas chamber 220, the first cavity 61 becomes larger and the volume of the airtight device thus increases, and consequently the gas pressure in the interior of the airtight device may be decreased. When the gas pressure in the interior of the sealing housing decreases, the elastic film 60 expands towards the first end 221 of the gas chamber 220, the first cavity 61 becomes smaller and the volume of the airtight device decreases, and consequently the gas pressure in the interior of the airtight device may be increased. Further, since the second cavity 62 is communicated with the atmosphere, the gas pressure in the first cavity may be maintained equal to that in the second cavity. That is, the gas pressure in the interior of the sealing housing may be maintained the same as the atmospheric pressure.

Similarly, the adjustment range of this gas pressure adjustment structure depends upon the size of the gas chamber 220. Therefore, the size of the gas chamber should be calculated and set according to change in temperature in the environment of the laser light source and change in temperature in the interior of the airtight device when the laser light source operates. The calculation method thereof is similar to the way of calculating and setting the size of the gas chamber in the above embodiment, and will not be repeated herein.

Preferably, the gas pressure adjustment structure in the above embodiment is mounted on the outer side of the laser device having large change in temperature rise (for example, the sealing housing on the outer side of the laser array). When the laser light source operates, the gas pressure adjustment structure can quickly relieve the change in gas pressure caused by the laser device having large change in temperature rise. In addition, also considering a space reserved for the peripheral design of components of the laser light source, the elastic film may be filled into the space reserved for the peripheral design of components of the laser light source by using irregular deformation. Such a design can omit the space occupied by an independently designed gas chamber, and make the location of the gas pressure adjustment device more flexible.

Figure 9:
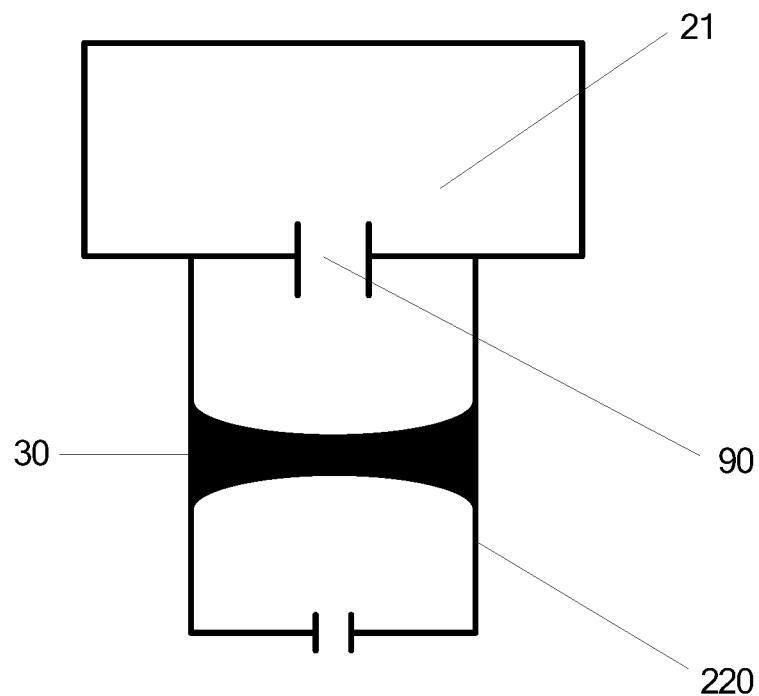
FIG. 9 is a schematic structure diagram of a sealing housing and a gas pressure adjustment structure according to the embodiments of the present disclosure.

As an example, referring to FIG. 9, the gas pressure adjustment structure 22 is fixed on the sealing housing 21, and the sealing housing 21 is communicated with the gas pressure adjustment structure 22 through a through-hole 90.

In FIG. 9, description is given by taking a case in which the gas pressure adjustment structure 22 includes a piston 30 and a gas chamber 220 as an example. By providing the gas pressure adjustment structure on the sealing housing may manufacture the sealing housing and the gas chamber of the gas pressure adjustment structure by a single process during the manufacturing of the airtight device. Hence, the manufacturing process of the airtight device may be simplified.

In addition, preferably, when the gas pressure adjustment structure is fixed on the sealing housing, the gas pressure adjustment structure is fixed on a side of the sealing housing. That is, the gas pressure adjustment structure is not fixed on the top or bottom of the sealing housing. Fixing the gas pressure adjustment structure on the side of the sealing housing facilitates the reduction of the thickness of the laser light source.

Figure 10:
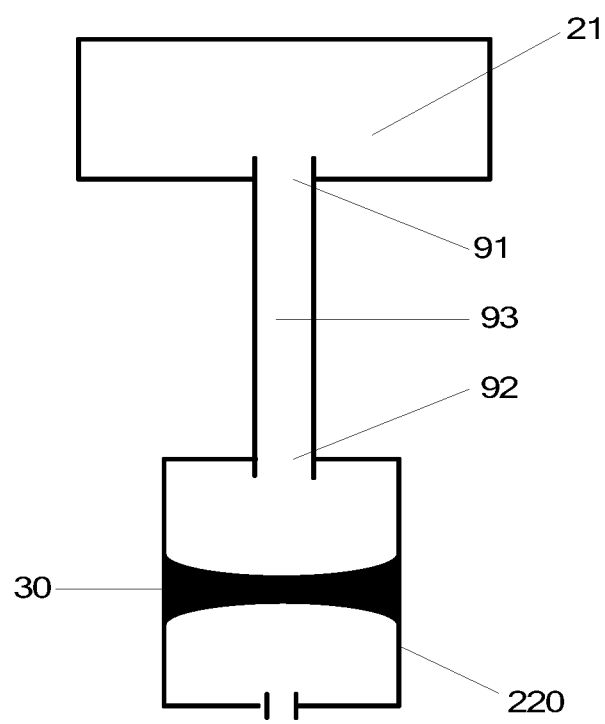

As an example, referring to FIG. 10, a first through-hole 91 is formed on the sealing housing 21, a second through-hole 92 is formed on the gas pressure adjustment structure 22, and the first through-hole 91 and the second through-hole are communicated with each other through a conduit 93.

In FIG. 10, description is given by taking a case in which the gas pressure adjustment structure 22 includes a piston 30 and a gas chamber 220 as an example. Structures such as cooling fins may be provided around the sealing housing 21. There may be a problem of insufficient space if providing the gas pressure adjustment structure around the sealing housing. In the above embodiment, by connecting the sealing housing and the gas pressure adjustment structure through a conduit, it is possible to provide the gas pressure adjustment structure in other locations, thus to avoid the problem of insufficient space.

Further, a filter structure may be further provided between the sealing housing 21 and the gas pressure adjustment structure 22; and the filter structure is configured to filter a gas stream flowing between the sealing housing and the gas pressure adjustment structure.

Although a sealing housing is adopted in the laser light source for the dust prevention purpose, the sealing housing can not be completely sealed, and it is thus possible for a small amount of dust to enter the interior of the sealing housing. In this case, it is necessary to further remove dust from the interior of the sealing housing. Providing a filter structure between the sealing housing 21 and the gas pressure adjustment structure 22 to filter a gas stream flowing between the sealing housing and the gas pressure adjustment structure may further remove dust from the interior of the airtight device. As an example, the filter structure may be a filter net which may be made of ultra low penetration air filter (ULPA) material or expended polytetrafluoroethylene (e-PTFE or expanded PTFE).

Preferably, when the gas pressure adjustment structure includes a gas chamber and a piston, both the piston and the gas chamber are made of metal.

Considering that the temperature in the interior of the sealing housing is high when the laser light source operates, if the gas chamber and the piston are made of elastic material (for example, rubber and silicone), the gas chamber and the piston are easily subjected to aging in a high-temperature environment, thereby resulting in poor sealing between the piston and the gas chamber and failing to meet the requirement on the service life of the laser light source. Hence, preferably, both the piston and the gas chamber are made of metal.

For the same reasons, when the gas pressure adjustment structure includes a gas chamber and an elastic film, the gas chamber is made of metal, and the elastic film is made of rubber or silicone.

It is necessary to replace the elastic film when it suffers from aging, so as to avoid the poor sealing of the airtight device caused by the aging of the elastic film and the resulting entering of dust into the interior of the airtight device.

For the same reasons, a first through-hole is formed on the sealing housing, a second through-hole is formed on the gas pressure adjustment structure, and the first through-hole and the second through-hole are communicated with each other through a conduit. The conduit is made of metal.

Embodiment 4

The embodiment of the present disclosure provides a laser projection display device including the laser light source provided in any one of the above embodiments. Specifically, the laser projection display device may be a laser TV set, a projector or the like. For example, taking the laser projection display device being a projector as an example, the projector may include the laser light source provided in any one of the above embodiments, as well as a lens, a casing, a switching power supply. Here, the specific form of the display device is not defined, as long as it includes the laser light source provided in the above embodiments.

The laser light source of the laser projection display device provided in this embodiment of the present disclosure includes a light source shell, an airtight device fixed on an inner wall of the light source shell, and a laser device provided in the interior of the airtight device. That is, by the airtight device, laser devices such as the laser array and the fluorescence conversion module are sealed in the interior of the airtight device as a whole. Furthermore, the airtight device consists of a sealing housing and a gas pressure adjustment structure, and the gas pressure adjustment structure can adjust the volume of the airtight device. Hence, in the embodiment of the present disclosure, when the gas pressure in the interior of the airtight device changes, the gas pressure in the interior of the airtight device of the laser light source may be maintained stable by adjusting the volume of the airtight device. Consequently, the gas exchange between the interior and the exterior of the sealing housing is reduced, and dust in the external gas is prevented from entering the interior of the airtight device during the process of gas stream exchange so that the dust prevention purpose is achieved.

The foregoing descriptions are merely the specific implementation ways of the present disclosure, and the protection scope of the present disclosure is not limited thereto. Any changes or replacements, which readily occur to those skilled in the art within the technical scope disclosed in the present disclosure, shall be included within the protection scope of the present disclosure. Hence, the protection scope of the present disclosure shall be subjected to the protection scope of the claims.

What is claimed is:

1. A laser projection display device, comprising a laser light source, wherein the laser light source comprises a light source shell, an airtight device fixed on an inner wall of the light source shell, and a laser device provided in the interior of the airtight device; and the airtight device comprises a sealing housing and a gas pressure adjustment structure, the sealing housing is fixed on an inner wall of the light source shell, the gas pressure adjustment structure is arranged to one side of the sealing housing, the sealing housing is communicated with the gas pressure adjustment structure, and the gas pressure adjustment structure is configured to adjust the volume of the airtight device;

wherein the gas pressure adjustment structure comprises: a gas chamber and a movable portion; the gas chamber comprises a first opening, and a second opening, the space between the movable portion and the first opening of the gas chamber forms a first cavity, the first cavity is communicated with the sealing housing via the first opening, the space between the movable portion and the second opening of the gas chamber forms a second cavity, the second cavity is communicated with the atmosphere via the second opening.

2. The laser projection display device according to claim 1, wherein the movable portion is a piston arranged between the first opening and the second opening of the gas chamber along an inner wall of the gas chamber.

3. The laser projection display device according to claim 2, wherein both the piston and the gas chamber are made of metal.

4. The laser projection display device according to claim 1, wherein the movable portion is an elastic film; and an outer edge of the elastic film is sealed on the inner wall between the first opening and the second opening of the gas chamber; and the elastic film can expand and shrink between the first opening and the second opening of the gas chamber.

5. The laser projection display device according to claim 4, wherein the gas chamber is made of metal and the elastic film is made of rubber or silicone.

6. The laser projection display device according to claim 1, wherein the gas pressure adjustment structure is fixed on the sealing housing, and the sealing housing is communicated with the gas pressure adjustment structure through a through-hole structure.

7. The laser projection display device according to claim 6, wherein the through-hole structure comprises a first through-hole formed on the sealing housing, and a second through-hole is foil led on the gas pressure adjustment structure, and the first through-hole and the second through-hole are communicated with each other through a conduit.

8. The laser projection display device according to claim 1, wherein a filter structure is further provided between the sealing housing and the gas pressure adjustment structure; and the filter structure is configured to filter a gas stream flowing between the sealing housing and the gas pressure adjustment structure.

9. A laser projection device, comprising:
a sealing housing;
a laser array, a beam shaping module, a fluorescence conversion module and a filter wheel, which are all arranged inside the sealing housing, light generated by the laser array enters the fluorescence conversion module via the beam shaping module, and the fluorescence conversion module is excited to emit fluorescence, the fluorescence is received and then output by a color filter and an output module;

wherein, a through-hole is arranged on the sealing housing, by which the gas pressure in an interior of the sealing housing is substantially not changed along with the change of temperature;

wherein, a ventilating filter net is arranged at the position where the through-hole is located, through which gas enters and exits the through-hole, the material of the ventilating filter net is waterproof breathable material.

10. The laser projection device according to claim 9, wherein, the material of the ventilating filter net is ultralow penetration air filter material.

11. The laser projection device according to claim 9, wherein, the material of the ventilating filter net is expended polytetrafluoroethylene.

12. The laser projection device according to claim 11, wherein, the ventilating filter net is arranged between the through-hole and the first cavity.

13. The laser projection device according to claim 11, wherein, the space inside the first cavity forms a completely sealed space together with the space inside the sealing housing communicated the first cavity via the through-hole.

14. The laser projection device according to claim 11, wherein, the movable portion is a piston or an elastic film.

15. The laser projection device according to claim 9, further comprising a gas pressure adjustment structure communicated with the through-hole, the gas pressure adjustment structure comprises: a gas chamber and a movable portion;

the gas chamber comprises a first opening, and a second opening, the space between the movable portion and the first opening of the gas chamber forms a first cavity, the first cavity is communicated with the through-hole via the first opening, the space between the movable portion and the second opening of the gas chamber forms a second cavity, the second cavity is communicated with the atmosphere via the second opening.

16. The laser projection device according to claim 9, wherein, the sealing housing is a housing which is sealed, an inner space of the sealing housing is completely sealed except the position of the through-hole.

17. The laser projection device according to claim 9, wherein, the sealing housing comprises a first sealing housing, a second sealing housing, and a third sealing housing, the laser array is arranged inside the first sealing housing, the beam shaping module is arranged inside the second sealing housing, the fluorescence conversion module and the filter wheel is arranged inside the third sealing housing.

18. The laser projection device according to claim 17, wherein, the first sealing housing, the second sealing housing, and the third sealing housing form an entire sealed space.

19. The laser projection device according to claim 9, wherein, the ventilating filter net is communicated with the atmosphere directly.

20. A laser projection device, comprising:
a first sealing housing and a laser array arranged inside the first sealing housing;
a second sealing housing and a beam shaping module arranged inside the second sealing housing;

a third sealing housing and a fluorescence conversion module and a color filter and output module arranged inside the third sealing housing;

a through-hole, arranged on at least one of the the first sealing housing, the second sealing housing, and the third sealing housing, by which the gas pressure in the interior of the at least one of the first sealing housing, the second sealing housing, and the third sealing housing are substantially not changed;

a ventilating filter net, arranged on the position of the through-hole, and gas enters and exits the through-hole through the ventilating filter net;

wherein, light generated by the laser array enters the fluorescence conversion module via the beam shaping module, and the fluorescence conversion module is excited to emit fluorescence, the fluorescence is received and then output by the color filter and output module;

wherein, a ventilating filter net is arranged at the position where the through-hole is located, through which gas enters and exits the through-hole, the material of the ventilating filter net is waterproof breathable material.

\* \* \* \* \*

UNITED STATES PATENT AND TRADEMARK OFFICE
CERTIFICATE OF CORRECTION

PATENT NO. : 10,317,782 B2
APPLICATION NO. : 15/172967
DATED : June 11, 2019
INVENTOR(S) : Xianrong Liu et al.

It is certified that error appears in the above-identified patent and that said Letters Patent is hereby corrected as shown below:

In the Claims

At Column 9, Claim 7, Line 56, please replace "foil led" with --formed--.

Signed and Sealed this
Eighth Day of October, 2019

Andrei Iancu
*Director of the United States Patent and Trademark Office*